US011155300B1

(12) United States Patent
Jansma et al.

(10) Patent No.: US 11,155,300 B1
(45) Date of Patent: Oct. 26, 2021

(54) VEHICULAR BODY STRUCTURAL ARRANGEMENT

(71) Applicants: Toyota Motor Engineering & Manufacturing North America, Inc., Plano, TX (US); Continental Structural Plastics, Inc., Auburn Hills, MI (US)

(72) Inventors: Matthew A. Jansma, Saline, MI (US); Christopher M. Higgins, Ann Arbor, MI (US); Steven D. Harmon, Jr., Fenton, MI (US)

(73) Assignees: Toyota Motor Engineering & Manufacturing North America, Inc., Piano, TX (US); Continental Structural Plastics, Inc., Auburn Hills, MI (US)

( * ) Notice: Subject to any disclaimer, the term of this patent is extended or adjusted under 35 U.S.C. 154(b) by 0 days.

(21) Appl. No.: 16/852,940

(22) Filed: Apr. 20, 2020

(51) Int. Cl.
*B62D 21/03* (2006.01)
*B62D 27/06* (2006.01)
*B62D 25/20* (2006.01)

(52) U.S. Cl.
CPC ......... *B62D 21/03* (2013.01); *B62D 25/2054* (2013.01); *B62D 27/06* (2013.01)

(58) Field of Classification Search
CPC ..... B62D 21/03; B62D 27/06; B62D 25/2054
USPC .............................................. 296/204, 184.1
See application file for complete search history.

(56) References Cited

U.S. PATENT DOCUMENTS

| 4,352,520 | A | * | 10/1982 | Stiglmaier | ............. | B62D 27/04 |
| | | | | | | 105/422 |
| 4,976,490 | A | * | 12/1990 | Gentle | .................. | B29C 70/023 |
| | | | | | | 296/183.1 |
| 6,543,828 | B1 | * | 4/2003 | Gass | .................... | B23K 11/002 |
| | | | | | | 296/35.1 |
| 6,902,228 | B2 | * | 6/2005 | Kikuchi | ............. | B62D 25/2072 |
| | | | | | | 296/193.07 |
| 8,770,651 | B2 | * | 7/2014 | Hagenbuch | ............ | B62D 25/20 |
| | | | | | | 296/184.1 |
| 9,321,385 | B2 | * | 4/2016 | Annetts | .................... | B60P 1/286 |
| 2007/0216197 | A1 | * | 9/2007 | Wuerfel, III | ....... | B62D 25/2054 |
| | | | | | | 296/184.1 |
| 2018/0001931 | A1 | * | 1/2018 | Higgins | ............. | B62D 25/2054 |

(Continued)

FOREIGN PATENT DOCUMENTS

WO       2015133743 A1    9/2015

*Primary Examiner* — Pinel E Romain
(74) *Attorney, Agent, or Firm* — Christopher G. Darrow; Darrow Mustafa PC (57) ABSTRACT

A vehicular body structural arrangement includes a polymeric deck panel. The deck panel includes corrugations, a crosswise crossbeam footprint and, along a partial length of the crossbeam footprint, two features for securing a crossbeam thereto. The corrugations include an adjacent ridge and valley. The features include a first feature having a first direction along the deck panel, and a second feature having a second direction toward the deck panel. The first feature includes a unitarily-formed web projecting normally to the deck panel past the ridge, and a rivet nut installed to the web against a backing facing the first direction. The second feature includes a unitarily-formed stanchion behind the web projecting normally to the deck panel from inside the valley, and a threaded insert seated in the stanchion facing the second direction.

8 Claims, 4 Drawing Sheets

(56) References Cited

U.S. PATENT DOCUMENTS

2020/0317277 A1\* 10/2020 Jansma ................... F16B 5/02
2020/0369198 A1\* 11/2020 Meingast ............. B60P 7/0815

\* cited by examiner

VEHICULAR BODY STRUCTURAL ARRANGEMENT

TECHNICAL FIELD

The embodiments disclosed herein relate to the bodies of vehicles and, more particularly, to structural arrangements for the bodies of vehicles with beds.

BACKGROUND

The bodies of vehicles and, more particularly, the structural arrangements for the bodies of vehicles with beds, have long been a focus of automotive design. Some of these structural arrangements involve bodies that, in association with the beds, include polymeric body elements or other alternatives to traditional metallic body elements.

SUMMARY

Disclosed herein are embodiments of a structural arrangement for the body of a vehicle with a bed. In one aspect, a vehicular body structural arrangement includes a polymeric deck panel. The deck panel includes corrugations, a crosswise crossbeam footprint and, along a partial length of the crossbeam footprint, two features for securing a crossbeam thereto. The corrugations include an adjacent ridge and valley. The features include a first feature having a first direction along the deck panel, and a second feature having a second direction toward the deck panel. The first feature includes a unitarily-formed web projecting normally to the deck panel past the ridge, and a rivet nut installed to the web against a backing facing the first direction. The second feature includes a unitarily-formed stanchion behind the web projecting normally to the deck panel from inside the valley, and a threaded insert seated in the stanchion facing the second direction. This and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a structural arrangement for realizing the benefits of a vehicle with a bed whose body includes associated polymeric body elements, including as part of a unitarily-formed polymeric bed box. Among other things, the vehicle enjoys improved mass compared to otherwise similar vehicles with traditional metallic body elements. Moreover, the polymeric body elements offer vehicle manufacturers opportunities for improved manufacturability, improved cost and the like.

In addition to the polymeric body elements, the body includes other body elements, including metallic body elements, for structural reinforcement and the like. As part of the body, a fastener-based structural arrangement is used to secure neighboring body elements, including metallic body elements, to one another without tightening the fasteners against the polymeric body elements. Although these and other teachings find application in the vehicle disclosed herein, it will be understood that this disclosure is applicable in principle to otherwise similar vehicles with any combination of polymeric body elements, other non-metallic and metallic alternatives to traditional metallic body elements, and traditional metallic body elements.

Figure 1A:
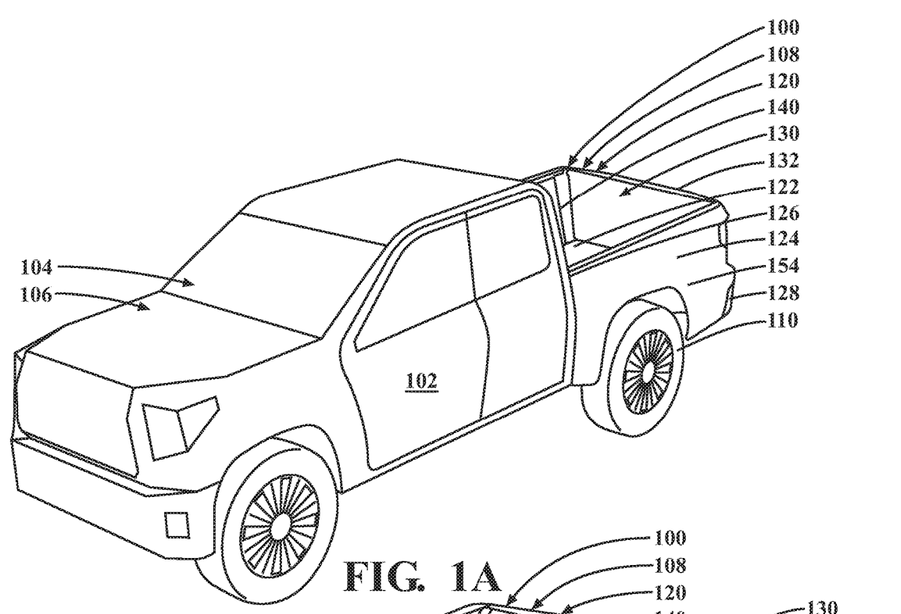
FIG. 1A is a perspective view of a vehicle with a bed whose body includes a polymeric bed box.
Figure 1B:
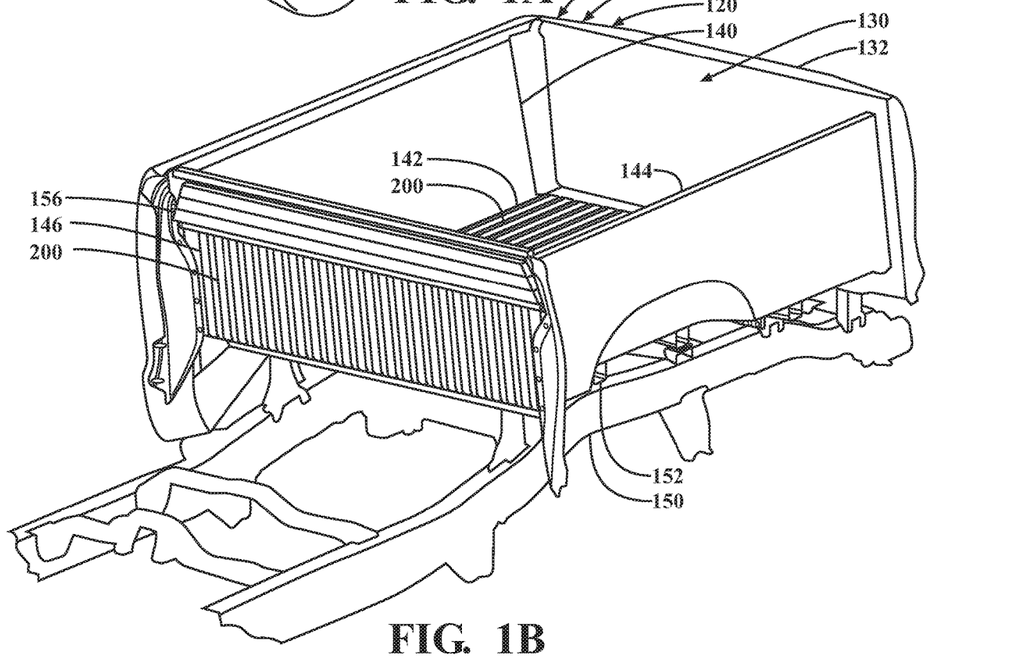
FIG. 1B is a perspective view of the body with a rear quarter panel removed for better viewing, showing frame rails, crossbeams resting atop the frame rails, a deck panel of the bed box resting atop the crossbeams, and a reinforcement backed against a bulkhead panel of the bed box.

A representative passenger vehicle 100 is shown in FIGS. 1A and 1B. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

As shown, the vehicle 100 is a pickup truck. The vehicle 100 includes an exterior 102 and a number of interior compartments. The compartments include a passenger compartment 104, an engine compartment 106 and, in the illustrated pickup truck configuration of the vehicle 100, an open-topped bed 108 for carrying cargo. Among other things, the vehicle 100 may include seats, a dash assembly, an instrument panel, controls and the like housed in the passenger compartment 104. Additionally, the vehicle 100 may include an engine, a motor, a transmission and the like, as well as other powertrain components, such as wheels 110, housed in the engine compartment 106 and elsewhere in the vehicle 100. The wheels 110 support the remainder of the vehicle 100 on the ground. One, some or all of the wheels 110 are powered by the remainder of the powertrain components to drive the vehicle 100 along the ground.

The vehicle 100 includes a body 120 that forms the exterior 102 and defines or otherwise encloses the bed 108 and other compartments. In relation to the bed 108, the body 120 includes a deck 122, two sides 124, a bulkhead 126 and a rear end 128. Additionally, in relation to the passenger compartment 104 and the engine compartment 106, the vehicle 100 may include a floor forward of the deck 122, a partition forward of the bulkhead 126, a front end, a roof, a hood and the like. At the rear end 128, the body 120 defines a tailgate opening 130. Similarly to other openings that open between the compartments and the exterior 102, the tailgate opening 130 opens between the bed 108 and the exterior 102. Relatedly, as part of the rear end 128, the body 120 includes a tailgate 132 corresponding to the tailgate opening 130. Similarly to other closure panels that correspond to other openings, the tailgate 132 is pivotally connected to the remainder of the body 120 for movement, relative to the tailgate opening 130, between a closed position over the tailgate opening 130, and an open position away from the tailgate opening 130.

The body 120 is constructed from any combination of rigidly interconnected frame members, panels and other body elements, as well as any combination of overlying paneling, trim, upholstery and other body coverings. In relation to the bed 108, the body 120 includes an open-topped bed box 140. Also referable to as an "inner," the bed box 140 is different from bed liners insofar as that while bed liners are essentially body coverings, the bed box 140 is a body element, and includes body sub-elements, indispensable to the construction of the body 120 itself. The bed box 140 includes a deck panel 142, two side panels 144 and a bulkhead panel 146. As part of the deck 122, the body 120 includes the deck panel 142 as an overlying body element, as well as two frame rails 150 and a number of crossbeams 152 as underlying body elements. Moreover, as part of the sides 124, the body 120 includes the side panels 144 as inner body elements, as well as two rear quarter panels 154 (one shown, with the other being a mirror image) as outer body elements. Moreover, as part of the bulkhead 126, the body 120 includes the bulkhead panel 146 as an inner body element, as well as an elongate reinforcement 156 as an outer body element. At the rear end 128, the body 120 defines the tailgate opening 130 in the space between side panels 144.

The deck 122 is horizontal, and extends longitudinally between the bulkhead 126 and the rear end 128, and laterally between the sides 124. At the deck 122, as part of the body 120, the frame rails 150, the crossbeams 152 and the deck panel 142 are secured to one another. Relatedly, the bed box 140 is secured at the deck panel 142 to the frame rails 150 via the crossbeams 152. As part of the deck 122, the frame rails 150, the crossbeams 152 and the deck panel 142 are horizontal, and vertically spaced apart from one another, with the crossbeams 152 overlying and resting atop the frame rails 150, and the deck panel 142, as well as the bed box 140 to which the deck panel 142 belongs, overlying and resting atop the crossbeams 152. The frame rails 150 are laterally spaced apart from one another, and extend longitudinally along the sides 124, from forward of the bulkhead 126, between the bulkhead 126 and the rear end 128. The crossbeams 152 are longitudinally spaced apart from one another between the bulkhead 126 and the rear end 128, and extend laterally between the frame rails 150 along the sides 124. The deck panel 142 extends longitudinally from the bulkhead 126, and laterally between the frame rails 150 along the sides 124.

The bulkhead 126 is upright, and extends vertically from the deck 122, and laterally between the sides 124. At the bulkhead 126, as part of the body 120, the bulkhead panel 146 and the reinforcement 156 are secured to one another. As part of the bulkhead 126, the bulkhead panel 146 and the reinforcement 156 are upright, and longitudinally spaced apart from one another, with the reinforcement 156 forward of and backed against the bulkhead panel 146. The bulkhead panel 146 extends vertically from the deck 122, and laterally between the frame rails 150 along the sides 124. The reinforcement 156 extends vertically from above the deck 122, and laterally between the frame rails 150 along the sides 124.

In relation to the bed box 140, the deck panel 142, as part of the bed box 140, extends longitudinally from the bulkhead panel 146, and laterally between the side panels 144. Moreover, the frame rails 150 extend longitudinally across the deck panel 142 alongside the lateral peripheries thereof. Moreover, the crossbeams 152 extend laterally across the deck panel 142 between the lateral peripheries thereof to end flush with the side panels 144. Relatedly, as part of the deck panel 142, the bed box 140 includes frame rail footprints and crossbeam footprints therefor respectively corresponding to the locations where the frame rails 150 and the crossbeams 152 extend or, in a preassembled state, will extend across the deck panel 142. As part of an integral unit with the bed box 140, the crossbeams 152 are directly secured thereto, including to the deck panel 142. Moreover, with the crossbeams 152 secured to the deck panel 142, the crossbeams 152 are secured to the frame rails 150.

The bulkhead panel 146, as part of the bed box 140, extends vertically from the deck panel 142, and laterally between the side panels 144. Moreover, the reinforcement 156 extends vertically from above the deck panel 142 across approximately the uppermost ⅓ of the bulkhead panel 146, laterally across the bulkhead panel 146 between the lateral peripheries thereof, and laterally past the bulkhead panel 146 to end laterally outside the junctions between the bulkhead panel 146 and the side panels 144. As part of an integral unit with the bed box 140, the reinforcement 156 is directly secured thereto, including to the bulkhead panel 146.

The bed box 140 has a molded or otherwise unitarily-formed construction. Moreover, the bed box 140 is made from one or more high-strength, durable and corrosion-resistant polymeric materials. For instance, the bed box 140 may be made from one or more fiber-reinforced thermosetting resins suitable for compression molding, such as sheet molding compound, including sheet molding compound featuring polyester and any combination of glass fibers (i.e., fiberglass), carbon fibers and the like. The body elements besides the bed box 140 may have molded constructions, and may be made from one or more polymeric materials suitable for molding, such as thermosetting resins, including fiber-reinforced thermosetting resins. Additionally, or alternatively, the body elements besides the bed box 140 may have any combination of fabricated, bent, stamped, extruded, casted and like constructions, and may be made from one or more metallic materials. For instance, the frame rails 150, the crossbeams 152 and the rear quarter panels 154 may be made from one or more metals, such as steel or aluminum. For instance, the reinforcement 156 has an extruded construction, and may be made from one or more metals suitable for extrusion, such as aluminum.

The body 120 imparts structure to the vehicle 100, including when the vehicle 100 experiences cargo loading or, in other words, locally normal loading on the vehicle 100 by cargo in the bed 108. The body 120, including the deck 122, the sides 124 and the bulkhead 126, plays a principal role in maintaining the bed 108 against cargo loading on behalf of the vehicle 100. Relatedly, each body element included as part of the deck 122, the sides 124 and the bulkhead 126 may play a role in strengthening the bed 108 against cargo loading.

Although the bed box 140 includes various surface geometries for increased rigidity, from the perspective of the body 120, the deck panel 142 and the bulkhead panel 146 alone, by design, have insufficient strengths against cargo loading. Rather than increasing the cross-sectional thicknesses of the deck panel 142 and the bulkhead panel 146 or otherwise introducing mass-related compromises for increased strength against cargo loading, the body 120 includes the crossbeams 152 and the reinforcement 156 for structural reinforcement. When the vehicle 100 experiences cargo loading at the deck 122, the crossbeams 152 structurally reinforce the body 120 against the deck panel 142 flexing toward the ground. Similarly, when the vehicle 100 experiences cargo loading at the bulkhead 126, the reinforcement 156 structurally reinforces the body 120 against the bulkhead panel 146 flexing toward the passenger compartment 104.

From its inner location enclosing the bed 108, the bed box 140 directly assumes cargo loading. As noted above, in order to strengthen the bed 108 against cargo loading, the bed box 140 includes various surface geometries for increased rigidity. For instance, as shown with additional reference to FIGS. 2A and 2B, the bed box 140 includes one or more corrugated sections 200. In the corrugated sections 200, the bed box 140 is rigidified or, in other words, has increased rigidity compared to otherwise similar bed boxes with non-corrugated sections.

Figure 2A:
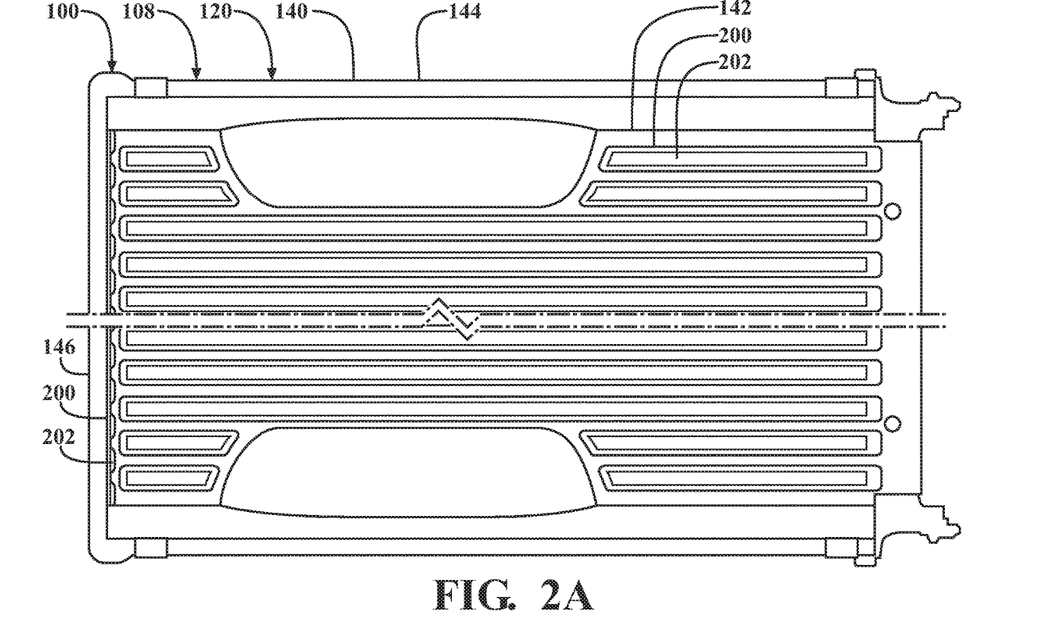
FIGS. 2A and 2B are top and bottom views, respectively, of a unit including the bed box, and the crossbeams and the reinforcement secured thereto, showing a corrugated section across the deck panel, and a corrugated section across the bulkhead panel.
Figure 2B:
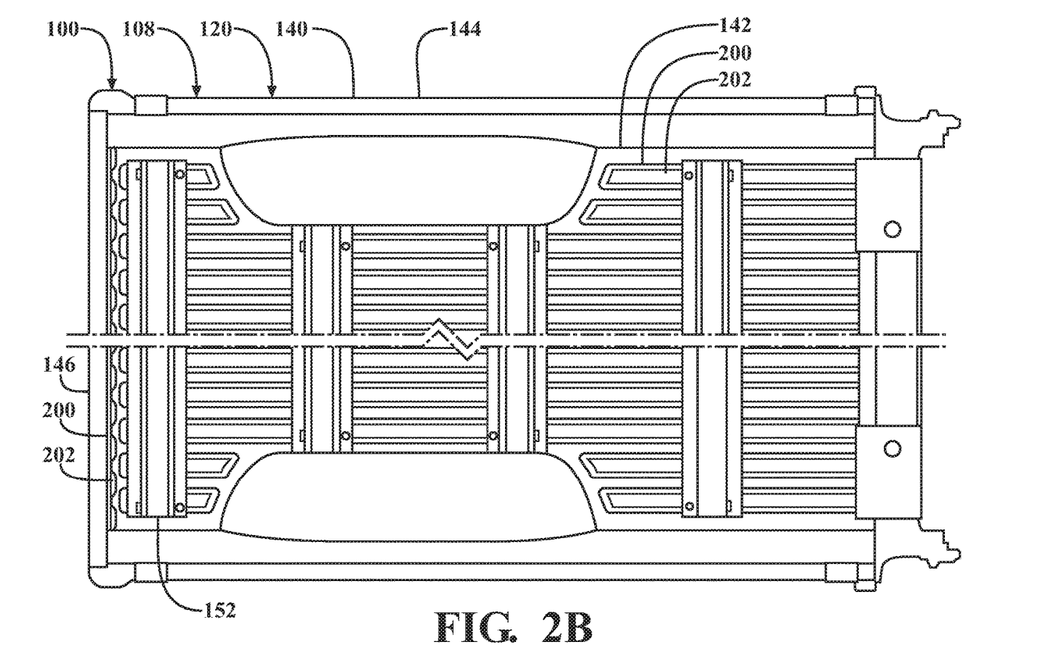

In each corrugated section 200, the bed box 140 is corrugated or, in other words, repeatedly doubled over itself. The bed box 140 thereby includes a series of unitarily-formed corrugations 202 or, in other words, adjacent ridges and valleys. One, some or all of the corrugations 202 may have hollowed trapezoidal cross-sectional shapes. For instance, as shown, each corrugation 202 has a hollowed trapezoidal cross-sectional shape. With the corrugations 202 having hollowed trapezoidal cross-sectional shapes, the corrugations 202 generally simulate a trapezoidal wave, and the bed box 140 includes adjacent flat-topped ridges and flat-bottomed valleys.

The bed box 140 includes a corrugated section 200 across the deck panel 142. In the corrugated section 200, the deck panel 142 is corrugated to include corrugations 202 that, with the deck panel 142 being horizontal, are adjacent underside ridges/topside valleys and topside ridges/underside valleys. In other words, the corrugations 202 are adjacent underside ridges and underside valleys that correspond to adjacent topside valleys and topside ridges. As shown, the deck panel 142 is laterally corrugated, with the corrugations 202 extending longitudinally crosswise to the crossbeams 152. Moreover, the corrugated section 200 is implemented across substantially all of the deck panel 142. Relatedly, with the deck panel 142 resting atop the crossbeams 152, the crossbeams 152 engage with the underside ridges, leaving spaces between the crossbeams 152 and the adjacent underside valleys.

Similarly, the bed box 140 includes a corrugated section 200 across the bulkhead panel 146. In the corrugated section 200, the bulkhead panel 146 is corrugated to include corrugations 202 that, with the bulkhead panel 146 being upright, are adjacent outside ridges/inside valleys and inside ridges/outside valleys. In other words, the corrugations 202 are adjacent outside ridges and outside valleys that correspond to adjacent inside valleys and inside ridges. As shown, the bulkhead panel 146 is laterally corrugated, with the corrugations 202 extending vertically crosswise to the reinforcement 156. Moreover, the corrugated section 200 is implemented across substantially all of the bulkhead panel 146. Relatedly, with the reinforcement 156 backed against the bulkhead panel 146, the reinforcement 156 engages with the outside ridges, leaving spaces between the reinforcement 156 and the adjacent outside valleys.

As noted above, as part of an integral unit with the bed box 140, the crossbeams 152 are directly secured to the deck panel 142. Specifically, the crossbeams 152 are secured to the deck panel 142 at securement points at the deck 122. The securement points are laterally across the deck panel 142 where, with the crossbeams 152 extending between the lateral peripheries thereof, the deck panel 142 overlies and rests atop the crossbeams 152.

As shown with additional reference to FIGS. 3A, 3B, 3C and 3D, the vehicle 100, as part of the body 120, includes a structural arrangement 300 for securing the crossbeams 152 to the deck panel 142 at one, some or all of the securement points. As shown for a representative structural arrangement 300, each structural arrangement 300 includes or is otherwise associated with a crossbeam 152 and the deck panel 142. Moreover, each structural arrangement 300 includes a first fastener 302 and a second fastener 304 for securing the crossbeam 152 to the deck panel 142. Relatedly, as part of the deck panel 142, each structural arrangement 300 includes a rivet nut 306 for the first fastener 302, a backing 308 for the rivet nut 306, and a threaded insert 310 for the second fastener 304. As shown, with configurations typical of screws, bolts and the like, the first fastener 302 includes a head 312 and a threaded shank 314 projecting from the head 312, and the second fastener 304 includes a head 316 and a threaded shank 318 projecting from the head 316.

Figure 3A:
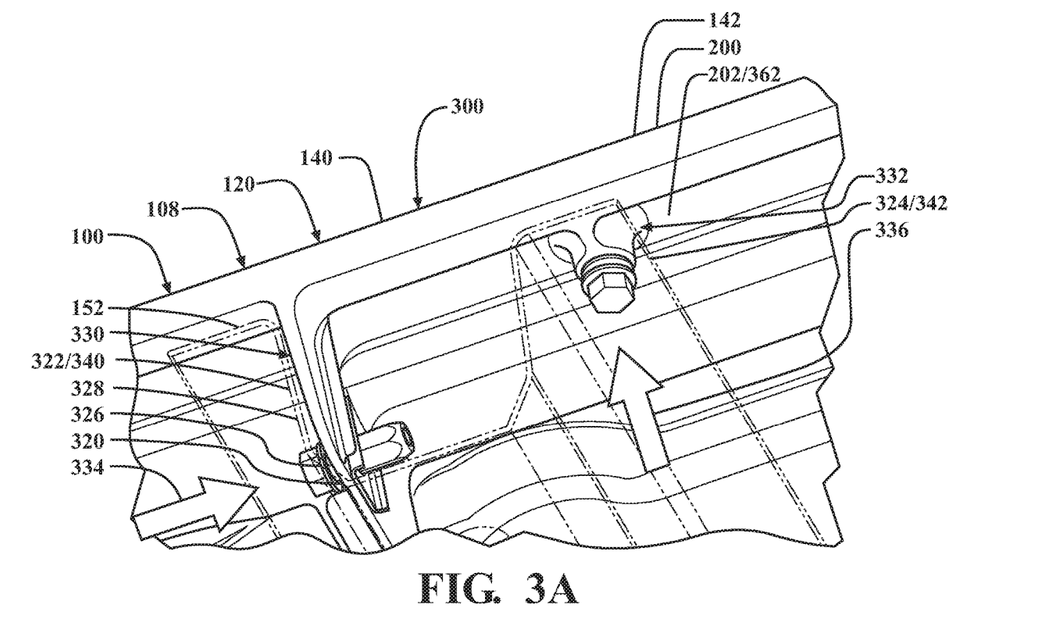
FIGS. 3A and 3B are perspective and cross-sectional views, respectively, of a fastener-based structural arrangement for securing a crossbeam to the deck panel, showing the crossbeam and the deck panel, as well as features of the deck panel by which associated fasteners secure the crossbeam to the deck panel without tightening against the deck panel.
Figure 3B:
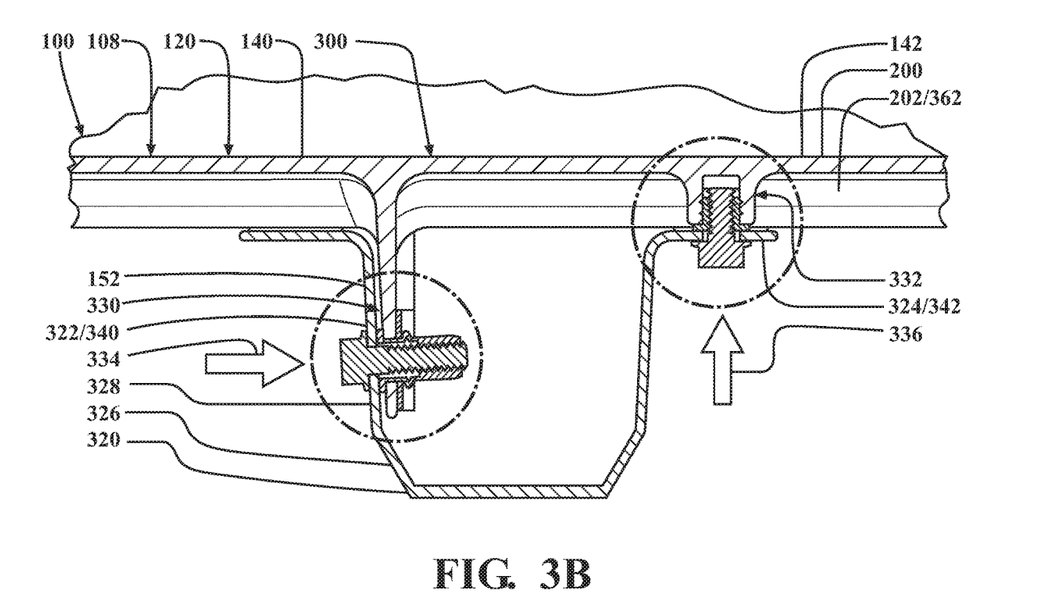
Figure 3C:
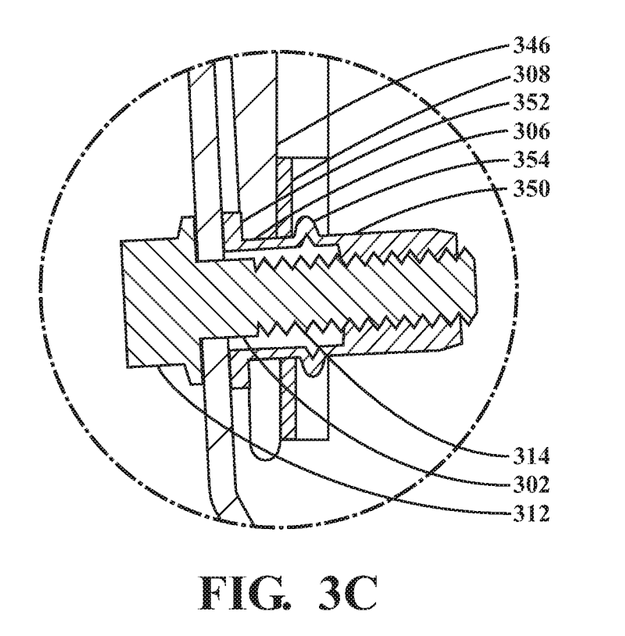
FIGS. 3C and 3D are cross-sectional views of the structural arrangement of FIGS. 3A and 3B, showing the fasteners securing the crossbeam to the deck panel.
Figure 3D:
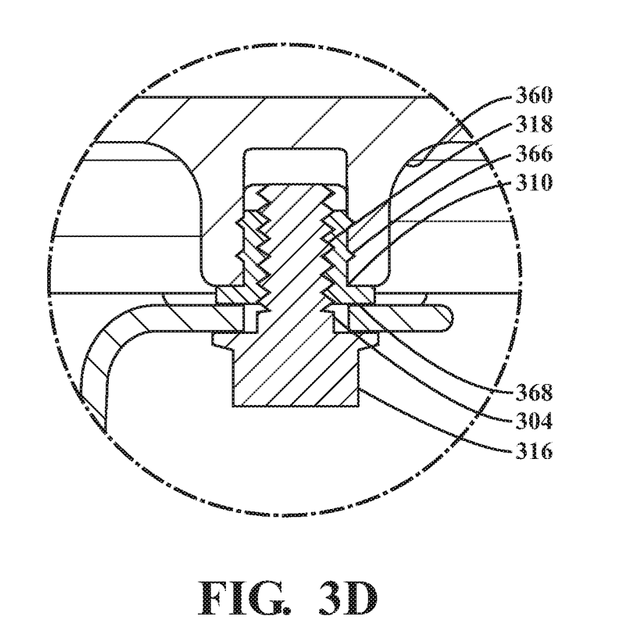

Among other aspects of the structural arrangement 300, with the first fastener 302 and the second fastener 304 securing the crossbeam 152 to the deck panel 142, the crossbeam 152 is secured to the deck panel 142 from underside the deck panel 142 without tightening the first fastener 302 or the second fastener 304 against the deck panel 142. As opposed to structural arrangements in which fasteners are tightened against the deck panel 142 to secure the crossbeam 152 thereto, the deck panel 142 does not suffer the threat of becoming deformed by the first fastener 302 or the second fastener 304, and the structural arrangement 300 does not suffer the associated threat of becoming compromised.

As noted above, the body elements besides the bed box 140 may have any combination of constructions, and may be made from one or more metallic materials. For instance, the first fastener 302, the second fastener 304, the rivet nut 306, the backing 308 and the threaded insert 310 may be made from one or more metals, such as steel or aluminum.

In relation to the structural arrangement 300, the crossbeam 152 is channel-like, and has a hat-shaped cross-sectional shape. Relatedly, the crossbeam 152 includes a base 320, two upturned sides 322 extending from the base 320, and two outturned rests 324 for the deck panel 142 respectively extending from the sides 322. With the base 320 being horizontal, the sides 322 being upright and the rests 324 being horizontal, the base 320, the sides 322 and the rests 324 are oriented with the crossbeam 152. As shown, the base 320 and the rests 324 are flat, and each side 322 includes a flat outward cant 326 and a flat upward rise 328.

The crossbeam 152 and the deck panel 142 are mutually configured for resting engagement in which, with the deck panel 142 resting atop the crossbeam 152, the deck panel 142 and the crossbeam 152 are engaged with one another. As shown, with the corrugations 202 being crosswise to the crossbeam 152, the deck panel 142 rests atop the crossbeam 152 on the rests 324, with the corrugations 202 and the rests 324 engaged with one another. Specifically, with the corrugations 202 being adjacent underside ridges and underside valleys, the underside ridges and the rests 324 engage with one another, leaving spaces between the rests 324 and the adjacent underside valleys.

As part of the structural arrangement 300, the deck panel 142, along a partial length of the crossbeam footprint for the crossbeam 152, includes two features underside the deck panel 142 for securing the crossbeam 152 thereto. As shown, the deck panel 142 includes a total of the two features for securing the crossbeam 152 thereto along the partial length of the crossbeam footprint. As shown, the partial length includes an end of the crossbeam footprint. Specifically, the partial length extends from an end of the crossbeam footprint to a middle of the crossbeam footprint. The features include a first feature 330 associated with the first fastener 302, and a second feature 332 associated with the second fastener 304. From underside the deck panel 142, the first feature 330 is inside the crossbeam 152 between the sides 322, with the sides 322 thereby flanking the first feature 330, and has a first direction 334 longitudinally along the deck panel 142 crosswise to the crossbeam 152. The second feature 332 is outside the crossbeam 152, and has a second direction 336 toward the deck panel 142. The crossbeam 152 and the deck panel 142 are mutually configured for resting engagement in which, with the deck panel 142 resting atop the crossbeam 152, one side 322/340 is backed to the first feature 330, and one rest 324/342 opposite the one side 322/340 is backed to the second feature 332.

As part of the first feature 330, the deck panel 142 includes a unitarily-formed flat-sided underside web 346 for the rivet nut 306. The underside web 346 is oriented normally to the first direction 334. With the deck panel 142 being horizontal, the underside web 346 is upright, and faces the first direction 334. As shown, the underside web 346 is oriented with the crossbeam 152 to extend laterally along the crossbeam 152. With the corrugations 202 being crosswise to the crossbeam 152, the underside web 346 is crosswise to the adjacent underside ridges and underside valleys, and projects normally to the deck panel 142 past the underside ridges.

In addition to the underside web 346, the first feature 330 includes the rivet nut 306 oriented with the first direction 334, and the backing 308 oriented with the underside web 346. The rivet nut 306 includes a threaded bore 350, and a rim flange 352 and a clinched side upset 354 along the threaded bore 350. With the rivet nut 306 initially including the threaded bore 350 and the rim flange 352, the side upset 354 is added with its installation. As shown, the rim flange 352 and the side upset 354 are longitudinally spaced apart from one another along the threaded bore 350. As shown, the backing 308 is flat.

With the backing 308 behind and backed against the underside web 346, and the rivet nut 306 aside the underside web 346 and facing the first direction 334, the rivet nut 306 is configured to install, trailing with the rim flange 352, to the underside web 346 against the backing 308. With its installation, the rivet nut 306 is configured to extend from aside the underside web 346 to the backing 308 through the underside web 346. From its position at the backing 308, the rivet nut 306 is configured to secure to the backing 308, including clinching against the backing 308. In association therewith, from its position aside the underside web 346, the rivet nut 306 is configured to engage with the underside web 346. Accordingly, with its installation, the rivet nut 306 secures the backing 308 to the underside web 346. As shown, with the rim flange 352 aside the underside web 346, the threaded bore 350 extends through the underside web 346 and through the backing 308, and the side upset 354 is clinched against the backing 308. In association with the side upset 354 clinching against the backing 308, from its position aside the underside web 346, the rim flange 352 engages the underside web 346.

As part of the second feature 332, the deck panel 142 includes a unitarily-formed underside stanchion 360 for the threaded insert 310 behind the underside web 346. The underside stanchion 360 is oriented with the second direction 336. With the deck panel 142 being horizontal, the underside stanchion 360 is upright, and faces the second direction 336. As shown, the underside stanchion 360 is inside one underside valley 200/362, and projects normally to the deck panel 142 from inside the one underside valley 200/362.

In addition to the underside stanchion 360, the second feature 332 includes the threaded insert 310 oriented with the second direction 336. The threaded insert 310 includes a threaded bore 366 and a rim flange 368. With the threaded insert 310 underneath the underside stanchion 360 and facing the second direction 336, the threaded insert 310 is configured to install, trailing with the rim flange 368, to the underside stanchion 360. As shown, with the installation of the threaded insert 310, the threaded bore 366 extends through the underside stanchion 360 and embeds thereto, and the rim flange 368 engages the underside stanchion 360. With the underside stanchion 360 inside the one underside valley 200/362, the rim flange 368 is flush with the adjacent underside ridges.

With the one side 322/340 backed to the first feature 330, the one side 322/340 and the rivet nut 306 are configured for engagement with one another. As shown, the one side 322/340 is backed against the rim flange 352, with the one side 322/340 and the rim flange 352 engaged with one another. In alignment with the rivet nut 306, the first fastener 302 is configured to install, leading with the threaded shank 314, from underside the deck panel 142. With its installation, the first fastener 302 is configured to extend from aside the one side 322/340 through the one side 322/340 to the rivet nut 306. As shown, with the head 312 aside the one side 322/340, the threaded shank 314 extends to the rivet nut 306 through the one side 322/340, and is threaded with the rivet nut 306. Specifically, the threaded shank 314 is threaded with the threaded bore 350. In association with the threaded shank 314 threading with the rivet nut 306, from its position aside the one side 322/340, the head 312 engages the one side 322/340.

As shown, with its installation, the first fastener 302 secures the one side 322/340 to the deck panel 142 in the first direction 334 against the rivet nut 306 at the rim flange 352. With the one side 322/340 secured against the rivet nut 306, the first fastener 302 secures the crossbeam 152 to the deck panel 142 in the first direction 334 without tightening against the deck panel 142 at the underside web 346. Accordingly, the deck panel 142 does not suffer the threat of becoming deformed by the first fastener 302, and the structural arrangement 300 does not suffer the associated threat of becoming compromised.

With the one rest 324/342 backed to the second feature 332, the one rest 324/342 and the threaded insert 310 are configured for engagement with one another. As shown, the one rest 324/342 is backed against the rim flange 368, with the one rest 324/342 and the rim flange 368 engaged with one another. In alignment with the threaded insert 310, the second fastener 304 is configured to install, leading with the threaded shank 318, from underside the deck panel 142. With its installation, the second fastener 304 is configured to extend from underside the one rest 324/342 through the one rest 324/342 to the threaded insert 310, including with play between the second fastener 304 and the one rest 324/342 in the first direction 334. Notwithstanding any combination of dimensional variations, manufacturing variations, assembly variations and the like in any combination of the crossbeam 152, the deck panel 142 and the second fastener 304, with the second fastener 304 extending through the one rest 324/342 to the threaded insert 310 with play between the second fastener 304 and the one rest 324/342 in the first direction 334, the second fastener 304 will reliably install following the installation of the first fastener 302. As shown, with the head 316 underside the one rest 324/342, the threaded shank 318 extends to the threaded insert 310 through the one rest 324/342, and is threaded with the threaded insert 310. Specifically, the threaded shank 318 is threaded with the threaded bore 366. In association with the threaded shank 318 threading with the threaded insert 310, from its position underside the one rest 324/342, the head 316 engages the one rest 324/342.

As shown, with its installation, the second fastener 304 secures the one rest 324/342 to the deck panel 142 in the second direction 336 against the threaded insert 310 at the rim flange 368. With the one rest 324/342 secured against the threaded insert 310, the second fastener 304 secures the crossbeam 152 to the deck panel 142 in the second direction 336 without tightening against the deck panel 142 at the underside stanchion 360. Accordingly, the deck panel 142 does not suffer the threat of becoming deformed by the second fastener 304, and the structural arrangement 300 does not suffer the associated threat of becoming compromised.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicular body structural arrangement, comprising: a polymeric deck panel, the deck panel including corrugations, a crosswise crossbeam footprint and, along a partial length of the crossbeam footprint, two features for securing a crossbeam thereto, the corrugations including an adjacent ridge and valley, and the features including a first feature having a first direction along the deck panel, and a second feature having a second direction toward the deck panel, the first feature including a unitarily-formed web projecting normally to the deck panel past the ridge, and a rivet nut installed to the web against a backing facing the first direction, and the second feature including a unitarily-formed stanchion behind the web projecting normally to the deck panel from inside the valley, and a threaded insert seated in the stanchion facing the second direction.

2. The vehicular body structural arrangement of claim 1, wherein the rivet nut, the backing and the threaded insert are metallic.

3. The vehicular body structural arrangement of claim 1, wherein along the partial length, the deck panel includes a total of the two features.

4. The vehicular body structural arrangement of claim 3, wherein the partial length includes an end of the crossbeam footprint.

5. The vehicular body structural arrangement of claim 3, wherein the partial length extends from an end of the crossbeam footprint to a middle of the crossbeam footprint.

6. The vehicular body structural arrangement of claim 1, further comprising:
a hat-shaped crossbeam along the crossbeam footprint, the crossbeam including a base, upturned sides extending from the base, and outturned rests respectively extending from the sides engaged with the deck panel, the sides flanking the first feature, and including one side backed to the first feature, and the rests including one rest opposite the one side backed to the second feature;
a first fastener extending through the one side to the rivet nut, the first fastener engaged with the one side, and threaded with the rivet nut, thereby securing the crossbeam to the deck panel in the first direction; and
a second fastener extending through the one rest to the threaded insert, the second fastener engaged with the one rest, and threaded with the threaded insert, thereby securing the crossbeam to the deck panel in the second direction.

7. The vehicular body structural arrangement of claim 6, wherein the rivet nut, the backing, the first fastener, the threaded insert and the second fastener are metallic.

8. The vehicular body structural arrangement of claim 6, wherein the second fastener extends through the one rest to the threaded insert with play between the second fastener and the one rest in the first direction.

* * * * *